US008874034B2

(12) United States Patent
Walley et al.

(10) Patent No.: US 8,874,034 B2
(45) Date of Patent: Oct. 28, 2014

(54) METHOD AND SYSTEM FOR QUICK BLUETOOTH LOW ENERGY (BLE) PROTOCOL SIGNAL PRESENCE DETECTION FOR COEXISTENCE

(75) Inventors: John S. Walley, Ladera Ranch, CA (US); Brima Babatunde Ibrahim, Aliso Viejo, CA (US); Steven Hall, Olivenhain, CA (US); Prasanna Desai, Olivenhain, CA (US); Yuan Zhuang, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1103 days.

(21) Appl. No.: 12/267,951

(22) Filed: Nov. 10, 2008

(65) Prior Publication Data

US 2010/0120362 A1    May 13, 2010

(51) Int. Cl.
*H04B 7/00* (2006.01)
*H04W 16/14* (2009.01)

(52) U.S. Cl.
CPC .................................... *H04W 16/14* (2013.01)
USPC ........ 455/41.2; 455/41.1; 455/41.3; 455/419; 455/552.1; 455/420; 455/445; 455/67.11; 455/67.13; 455/63.1; 455/90.2; 370/338; 370/401; 370/341; 370/328; 370/310

(58) Field of Classification Search
USPC .......... 455/41.2, 552.1, 419, 420, 445, 67.11, 455/67.13, 63.1, 90.2, 553.1; 370/338, 401, 370/341, 328, 344, 230, 310
See application file for complete search history.

(56) References Cited

U.S. PATENT DOCUMENTS

| 6,292,508 | B1 * | 9/2001 | Hong et al. ................... 375/134 |
| 6,400,751 | B1 * | 6/2002 | Rodgers ........................ 375/132 |
| 6,430,395 | B2 * | 8/2002 | Arazi et al. .................. 455/41.2 |
| 6,519,460 | B1 * | 2/2003 | Haartsen .................... 455/452.1 |
| 6,842,607 | B2 * | 1/2005 | Godfrey et al. .............. 455/41.2 |

(Continued)

FOREIGN PATENT DOCUMENTS

| CN | 136274 A | 8/2002 |
| EP | 1220499 A2 | 7/2002 |
| EP | 1703675 A1 | 9/2006 |

OTHER PUBLICATIONS

EPO Communication dated Jun. 15, 2010 regarding Application No. 09013961.9-1525.

(Continued)

*Primary Examiner* — Ganiyu A Hanidu
(74) *Attorney, Agent, or Firm* — McDermott Will & Emery LLP

(57) ABSTRACT

Aspects of the invention may comprise managing operations of BLE interfaces and/or other radio interfaces in a wireless device to mitigate interference to communication via the BLE interfaces by the other radio interfaces. Operating parameters may be communicated between the BLE interfaces and the other radio interfaces to enable mitigating the interference to the BLE interfaces, and at least some of the BLE interfaces and/or the other radio interfaces may be configured based on the communicated operating parameters. The operating parameters may comprise adaptive frequency hopping (AFH) maps that may be adjusted to prevent use of common and/or used channels. The communication device may detect energy associated with BLE communication via scan of all or some of channels used for BLE communication. BLE communication may be predicted based on monitoring of frequency bands used during BLE communication, and/or monitoring of events that may trigger and/or occur during BLE communication.

24 Claims, 6 Drawing Sheets

(56) References Cited

U.S. PATENT DOCUMENTS

| | | | |
|---|---|---|---|
| 7,468,963 B2* | 12/2008 | Capretta | 370/329 |
| 7,873,385 B2* | 1/2011 | Boireau et al. | 455/553.1 |
| 2004/0028003 A1 | 2/2004 | Diener et al. | |
| 2004/0137849 A1 | 7/2004 | Kloper et al. | |
| 2007/0066314 A1* | 3/2007 | Sherman et al. | 455/445 |
| 2007/0224936 A1 | 9/2007 | Desai | |
| 2007/0280332 A1 | 12/2007 | Srikanteswara et al. | |
| 2009/0122775 A1* | 5/2009 | Haartsen | 370/338 |
| 2009/0149127 A1* | 6/2009 | Viitamaki et al. | 455/41.2 |
| 2009/0176454 A1* | 7/2009 | Chen et al. | 455/63.1 |
| 2009/0180429 A1* | 7/2009 | Stevens et al. | 370/329 |
| 2009/0207014 A1* | 8/2009 | Ayed | 340/539.13 |
| 2009/0234728 A1* | 9/2009 | Willuns et al. | 705/14 |
| 2009/0323720 A1* | 12/2009 | Salokannel et al. | 370/468 |
| 2010/0091818 A1* | 4/2010 | Sen et al. | 375/136 |
| 2010/0235285 A1* | 9/2010 | Hoffberg | 705/75 |

OTHER PUBLICATIONS

Office Action in co-pending, related Chinese Patent Application, mailed Apr. 28, 2012.

* cited by examiner

METHOD AND SYSTEM FOR QUICK BLUETOOTH LOW ENERGY (BLE) PROTOCOL SIGNAL PRESENCE DETECTION FOR COEXISTENCE

CROSS-REFERENCE TO RELATED APPLICATIONS/INCORPORATION BY REFERENCE

[Not Applicable.]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to processing signals. More specifically, certain embodiments of the invention relate to a method and system for quick Bluetooth low energy (BLE) protocol signal presence detection for coexistence.

BACKGROUND OF THE INVENTION

Various radio frequency (RF) applications may share communication frequencies during transmission. Accordingly, an RF receiver or a receiver portion of an RF transceiver may need to deal with a presence of large interfering signals lying within the passband that corresponds to a communication channel of interest. These interfering signals may have originated from users in adjacent channels and/or from transmission sources which may be relatively far removed in frequency from the channel of interest but whose large transmission power may still cause significant interference problems. These interfering signals may be referred to as blockers, and their relative frequency and/or detected power to that of the desired signal may vary based on transmission scheme and/or operational conditions. The effect of interfering signals in the channel of interest may result in, for example, bit error rate (BER) degradation in digital RF systems and audible and/or visible signal-to-noise ratio (SNR) degradation in analog RF systems.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for quick Bluetooth low energy (BLE) protocol signal presence detection for coexistence, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for quick Bluetooth low energy (BLE) protocol signal presence detection for coexistence. Aspects of the invention may comprise determining, in a communication device that comprises a plurality of BLE interfaces and a plurality of other radio interfaces, which of the other radio interfaces will interfere with any of the plurality of BLE interfaces, and managing operations of the plurality of BLE interfaces and/or the plurality of other radio interfaces to mitigate the determined interference. Operating parameters may be communicated between the plurality of BLE interfaces and the plurality of other radio interfaces to enable mitigating interference to any of the plurality of BLE interfaces by any of the plurality of other radio interfaces. At least some of the plurality of BLE interfaces and/or the plurality of other radio interfaces may be configured based on the communicated operating parameters. The operating parameters may comprise adaptive frequency hopping (AFH) maps that may be utilized by the plurality of BLE interfaces and/or the plurality of other radio interfaces. The AFH maps of the plurality of other radio interfaces may be adjusted to enable or disable at least some of plurality of frequency bands that may be utilized by both of the plurality of BLE interfaces and the plurality of other radio interfaces. The communication device may be enabled to detect energy associated with communication via any of the plurality of BLE interfaces. The energy detection may be performed by scanning plurality of frequency bands that may be utilized for communication via the plurality of BLE interfaces. A subset of the plurality of frequency bands may be scanned for energy detection, and the number of channels scanned in subsequent scans may then be increased. Communication via the plurality of BLE interfaces may also be predicted based on monitoring of at least some of the plurality of frequency bands that may be used during communication by any of the plurality of BLE interfaces, and/or monitoring of at least of the events that may trigger communication via any of the plurality of BLE interfaces.

Figure 1:
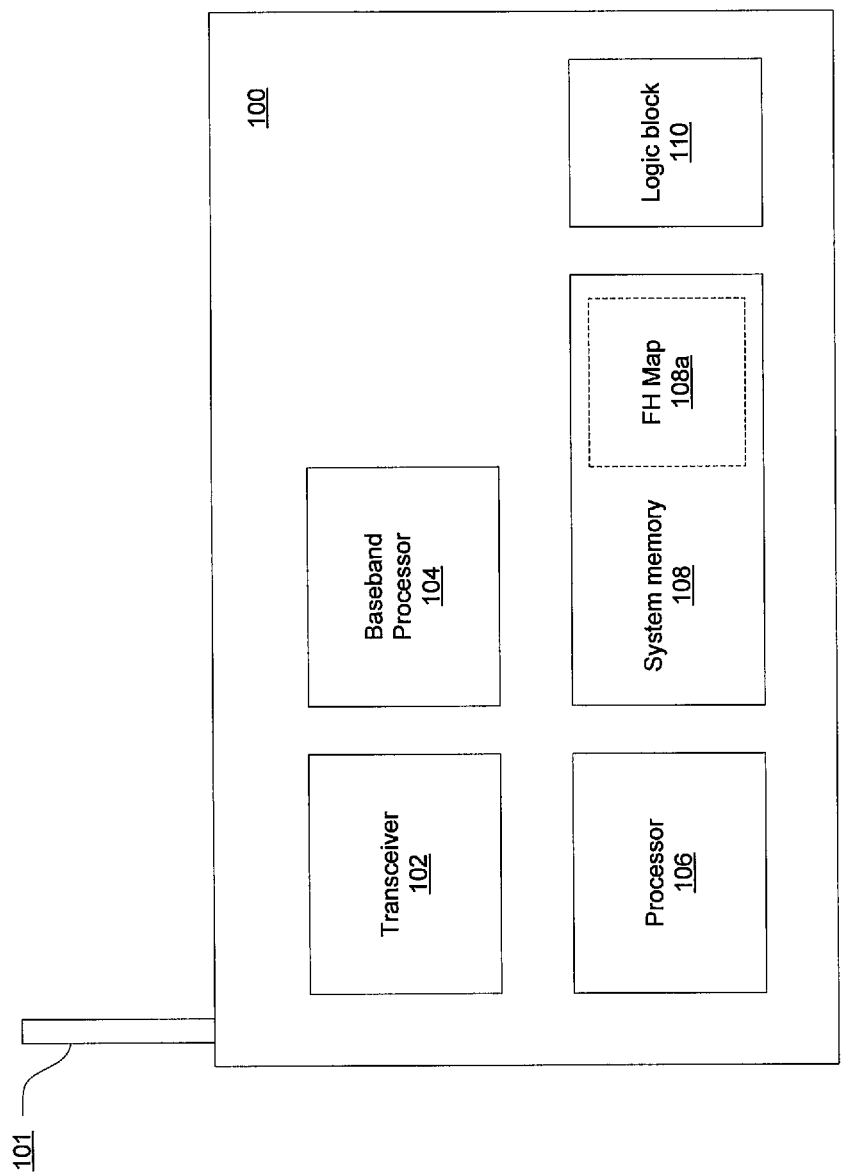
FIG. 1 is a block diagram of an exemplary wireless device, which may be utilized in connection with an embodiment of the invention.

FIG. 1 is a block diagram of an exemplary wireless device, which may be utilized in connection with an embodiment of the invention. Referring to FIG. 1, the wireless device 100, which may be a mobile terminal, may comprise an antenna 101, a transceiver 102, a baseband processor 104, a processor 106, a system memory 108, and a logic block 110. The antenna 101 may be used for reception and/or transmission of RF signals. The transceiver 102 may comprise suitable logic, circuitry, and/or code that may be enabled to modulate and upconvert baseband signals to RF signals for transmission by one or more antennas, which may be represented generically by the antenna 101.

The transceiver 102 may also be enabled to downconvert and demodulate received RF signals to baseband signals. The RF signals may be received by one or more antennas, which may be represented generically by the antenna 101. Different wireless devices, or mobile terminals, may use different antennas for transmission and reception. The transceiver 102 may be enabled to execute other functions, for example, filtering the baseband and/or RF signals, and/or amplifying the baseband and/or RF signals.

The baseband processor 104 may comprise suitable logic, circuitry, and/or code that may be enabled to process baseband signals for transmission via the transceiver 102 and/or the baseband signals received from the transceiver 102. The processor 106 may be any suitable processor or controller such as a CPU or DSP, or any type of integrated circuit processor. The processor 106 may comprise suitable logic, circuitry, and/or code that may be enabled to control the operations of the transceiver 102 and/or the baseband processor 104. For example, the processor 106 may be utilized to update and/or modify programmable parameters and/or values in a plurality of components, devices, and/or processing elements in the transceiver 102 and/or the baseband processor 104.

Control and/or data information, which may comprise the programmable parameters, may be transferred from other portions of the wireless device 100, which may not be shown, to the processor 106. Similarly, the processor 106 may be enabled to transfer control and/or data information, which may comprise the programmable parameters, to other portions of the wireless device 100, which may not be shown, which may be part of the wireless device 100.

The processor 106 may utilize the received control and/or data information, which may comprise various programmable parameters, to determine an operating mode of the transceiver 102. For example, the processor 106 may be utilized to select a specific frequency for a local oscillator, a specific gain for a variable gain amplifier, configure the local oscillator and/or configure the variable gain amplifier for operation in accordance with various embodiments of the invention. Moreover, the specific frequency selected and/or parameters needed to calculate the specific frequency, and/or the specific gain value and/or the parameters, which may be utilized to calculate the specific gain, may be stored in the system memory 108 via the processor 106, for example. The information stored in system memory 108 may be transferred to the transceiver 102 from the system memory 108 via the processor 106. The system memory 108 may comprise suitable logic, circuitry, and/or code that may be enabled to store a plurality of control and/or data information, including parameters needed to calculate frequencies and/or gain. Accordingly, the system memory 108 may store one or more frequency hopping maps 108a.

The logic block 110 may comprise suitable logic, circuitry, and/or code that may enable controlling of various functionalities of the wireless device 100. For example, the logic block 110 may comprise one or more state machines that may generate signals to control the transceiver 102 and/or the baseband processor 104. The logic block 110 may also comprise registers that may hold data for controlling, for example, the transceiver 102 and/or the baseband processor 104. The logic block 110 may also generate and/or store status information that may be read by, for example, the processor 106. Amplifier gains and/or filtering characteristics, for example, may be controlled by the logic block 110.

Figure 2:
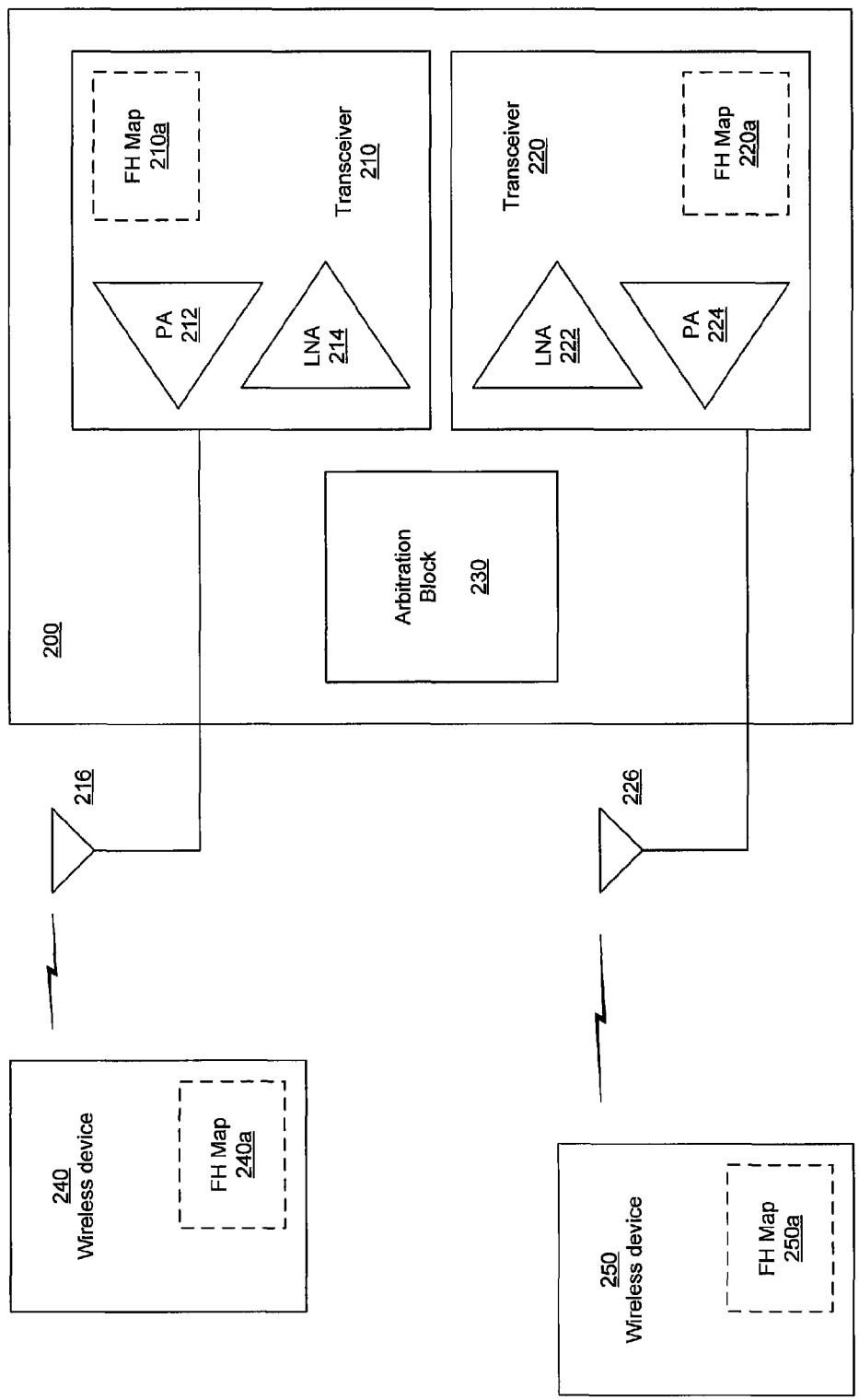
FIG. 2 is a block diagram illustrating exemplary interference for collocated transceivers, in accordance with an embodiment of the invention.

FIG. 2 is a block diagram illustrating exemplary interference for collocated transceivers, in accordance with an embodiment of the invention. Referring to FIG. 2, there is shown a wireless device 200 that comprises, for example, transceivers 210 and 220, and an arbitration block 230. The transceivers 210 and 220 may comprise, for example, frequency hopping maps 210a and 220a, respectively. There may also be one or more wireless devices 240 and 250 with which the wireless device 200 may communicate. The transceiver 210 may comprise, for example, a power amplifier 212 and a low noise amplifier 214. The power amplifier 212 may comprise suitable circuitry that may enable providing gain for RF signals to be transmitted by, for example, the antenna 214. The low noise amplifier 214 may comprise suitable circuitry that may enable amplification of RF signals received, for example, via the antenna 216. Similarly, the transceiver 220 may comprise a low noise amplifier 222 and a power amplifier 224, where signals may be communicated to the low noise amplifier 222 via the antenna 224, and signals communicated to the antenna 224 by the power amplifier 224. The arbitration block 230 may comprise suitable logic, circuitry, and/or code that may enable determining when transmission may occur by each of the transceivers 210 and 220 to minimize interference between the transceivers 210 and 220.

In operation, the transceiver 210 may indicate to the arbitration block 230 that it may transmit at a particular time at a particular frequency. The transceiver 220 may also indicate to the arbitration block 230 that it may also transmit at a particular time at a particular frequency. If the times at which the transceivers 210 and 220 are to transmit overlap, and if the frequencies at which they transmit are close enough to each other, if not the same frequency, then there may be interference between the signals transmitted by the transceivers 210 and 220.

Accordingly, the arbitration block 230 may determine which of the transceivers 210 and 220 may transmit. This may be determined, for example, by a priority associated with each transmission by the transceivers 210 and 220. The arbitration block 230 may have information on when each of the transceivers 210 and 220 may transmit in instances, for example, where the transceiver 210 may be associated with a master Bluetooth device and the transceiver 220 may be associated with a master Bluetooth low energy device. In each of those cases, the transceivers 210 and 220 may, for example, communicate adaptive frequency hopping maps to the arbitration block 230. A frequency hopping map 108a, 210a, and/or 220a may be stored, for example, in the system memory 108, and/or in the transceivers 210 and/or 220.

Accordingly, the arbitration block 230 may enable transmission by both transceivers 210 and 220 when there is little likelihood of interference for the transmitted signals. The arbitration block 230 may also have the capability to modify the frequency hopping maps for one or both of the transceivers 210 and 220 so that both may transmit without interfering with each other. In some embodiments of the invention, both transceivers 210 and 220 may share a common transmitter. This may be the case, for example, when the transceiver 210 is a Bluetooth device and the transceiver 220 is an Bluetooth low energy device, where both transceivers 210 and 220 share a frequency spectrum for communication.

In some instances, signals received simultaneously by the transceivers 210 and 220 and the signals may interfere with each other such that signals received by one or both of the transceivers 210 and 220 may be corrupted. This interference may be alleviated, for example, when the wireless device 200 may communicate to the transmitting devices which channels may be acceptable for reception and which channels may not be acceptable for reception. The transmitting devices, such as the wireless devices 240 and 250, may then use this information to appropriately manage their adaptive frequency hopping maps 240a and 240b, respectively. The wireless devices may also, for example, exchange channel mapping information.

In some instances, the transceiver 210 may transmit a signal at about the time that the transceiver 220 may be receiving a signal from, for example, the wireless device 240. Accordingly, if the frequencies used for transmission by the transceiver 210 are close enough to the frequency of the signal being received by the transceiver 220, the signals transmitted by the transceiver 210 may interfere with the signals being received by the transceiver 220. As described above, the transceiver 220 may provide channel assessment feedback to the wireless device 240. Accordingly, the wireless device 240 may avoid using the channels where there may be much interference.

Figure 3:
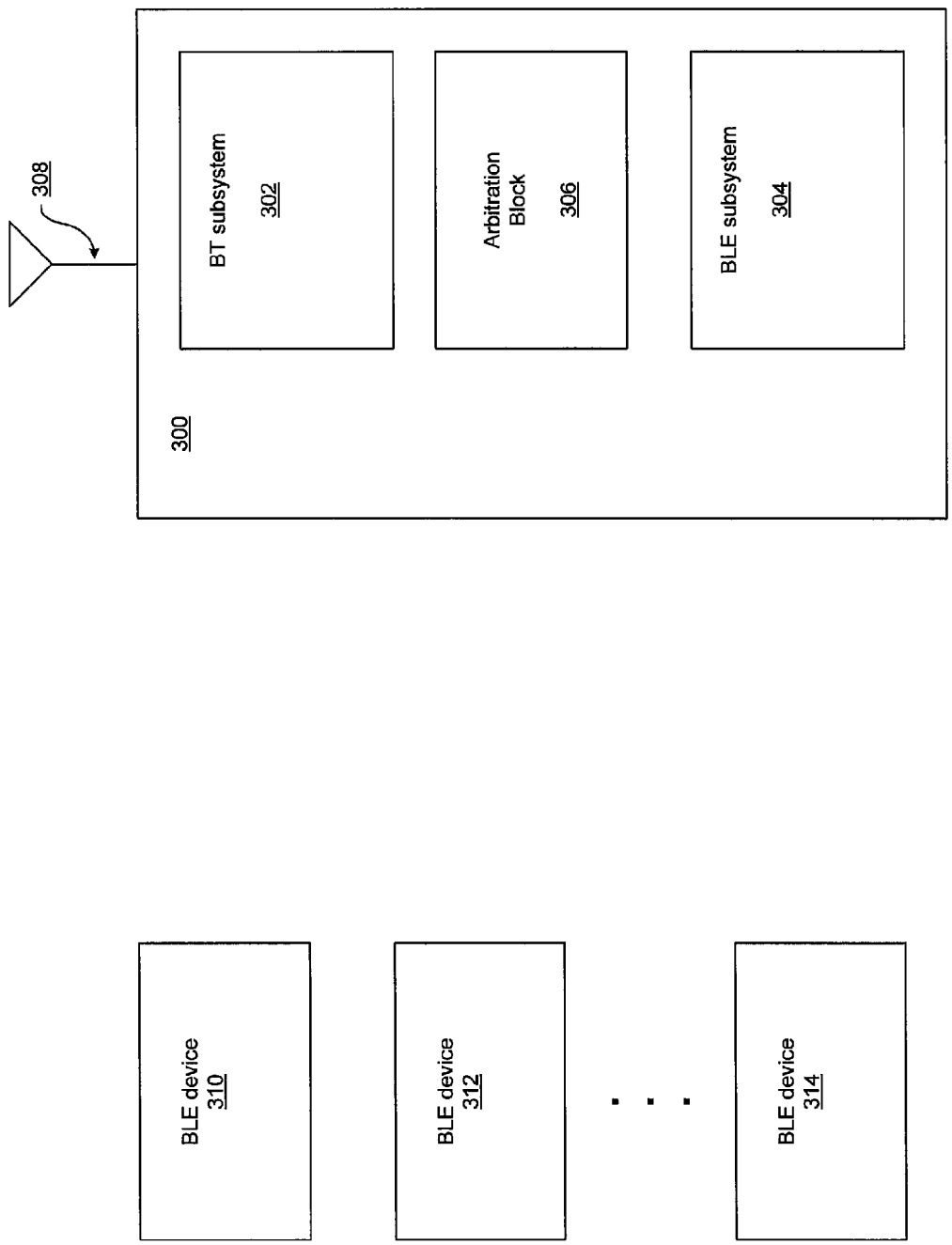
FIG. 3 is a block diagram illustrating a Bluetooth device among a plurality of Bluetooth low energy devices, in accordance with an embodiment of the invention.

FIG. 3 is a block diagram illustrating a Bluetooth device among a plurality of Bluetooth low energy devices, in accordance with an embodiment of the invention. Referring to FIG. 3, there is shown a wireless device 300 that comprises, for example, a Bluetooth subsystem 302, an Bluetooth low energy subsystem 304, an arbitrator block 306, and an antenna 308. There is also shown a plurality of Bluetooth low energy devices 310, 312, . . . , 314. The wireless device 300 may be similar to the wireless device 200.

The Bluetooth subsystem 302 may comprise suitable logic, circuitry, and/or code that may enable communication of information using the Bluetooth protocol. The Bluetooth low energy subsystem 304, 310, 312, . . . , 314 may comprise suitable logic, circuitry, and/or code that may enable communication of information using, for example, Bluetooth specification for Bluetooth low energy devices. The Bluetooth low energy devices 310, 312, . . . , 314 may communicate with, for example, the Bluetooth low energy subsystem 304.

The arbitration block 306 may be similar to the arbitration block 230. Accordingly, the arbitration block 306 may comprise suitable logic, circuitry, and/or code that may enable determining when transmission may occur by the Bluetooth subsystem 302 and the Bluetooth low energy subsystem 304 to minimize interference between the devices 302 and 304.

In an exemplary scenario, the wireless device 300 may scan Bluetooth channels for signal activity in the Bluetooth low energy frequency spectrum during a portion of the periods when the Bluetooth subsystem 302 is not transmitting data or receiving data. The scanning may comprise a normal scan and/or a fast scan. Normal scans may comprise, for example, performing, via non-BLE Bluetooth devices, page scans wherein the Bluetooth device scans all supported Bluetooth frequency to determine whether it may be paged by any of other devices in a Bluetooth piconet, based on an unique identity for example. A fast scan may comprise searching for any activity in, for example, the Bluetooth frequency range. If a fast scan detects signal activity, then a more thorough scan, such as, for example, a normal scan may be used to detect a specific channel where the signal activity may be present. Another type of fast scan that may be used by various embodiments of the invention may comprise detecting signals on those channels that may be used for setting up Bluetooth low energy communication. For example, Bluetooth low energy devices may use three set-up channels. The specific method of determining whether Bluetooth low energy activity may be present may be design and/or implementation dependent. The signal activity may comprise transmission of packets for a channel set-up, such as, for example, advertisement packets, and/or data packets once communication channel has been set up.

Once Bluetooth low energy activity is detected, the wireless device 300 may, for example, avoid use of at least one of the set-up channels that may be used by the Bluetooth low energy devices for setting up communication channels. For example, the Bluetooth low energy standard indicates that three channels be used for set-up. Accordingly, the Bluetooth subsystem 302 may avoid using at least one of the three set-up channels.

Furthermore, various embodiments of the invention may also avoid using at least some of the channels that may be used for normal communication by Bluetooth low energy devices, such as, for example, the Bluetooth low energy devices 304, and/or 310, 312, . . . , 314. For example, Bluetooth devices may use 80 channels where each channel has a center frequency of (2402+K) MHz, and where K is an integer from 0 to 79. Ultra-low power Bluetooth devices may use, for example, 40 channels where each channel has a center frequency of (2402+2L) MHz, and where L is an integer from 0 to 39. Ultra-low power Bluetooth devices may also use, for example, channels with frequencies (2402+2M) MHz, where M may be 0, 19, and 39, as set-up channels. Accordingly, for example, an embodiment of the invention may detect Bluetooth low energy signal activity in the frequency spectrum from 2402 MHz to (2402+78) MHz, and then avoid using at least one of the frequency channels with frequencies (2402+2M) MHz, where M may be 0, 19, and 39.

Additionally, various embodiments of the invention may also avoid using at least some of the non-set up channels that may be used by the Bluetooth low energy devices 304, and/or 310, 312, . . . , 314. For example, upon detection of Bluetooth low energy activity, various embodiments of the invention may apply a usage weight algorithm where each channel that is not used by the Bluetooth low energy devices 304, and/or 310, 312, . . . , 314 may be used more often for communication than each channel that is used by the Bluetooth low energy devices 304, and/or 310, 312, . . . , 314. Accordingly, the chances of the Bluetooth device transmitting on a channel used by Bluetooth low energy devices may be reduced. In accordance with an exemplary embodiment of the invention, upon detecting Bluetooth low energy signal activity, the channels designated for use by the Bluetooth low energy devices 304 and/or 310, 312, . . . , 314, may be avoided. Another embodiment of the invention may comprise avoiding use of the set-up channels for the Bluetooth low energy devices at all times.

In an exemplary aspect of the invention, results from fast scan, if it is performed frequently enough, may allow for an estimation of the advertising interval. Advertising interval estimations may the be utilized to enable using narrower scan windows, which may reduce power consumption overall in the BLE Bluetooth device.

Figure 4:
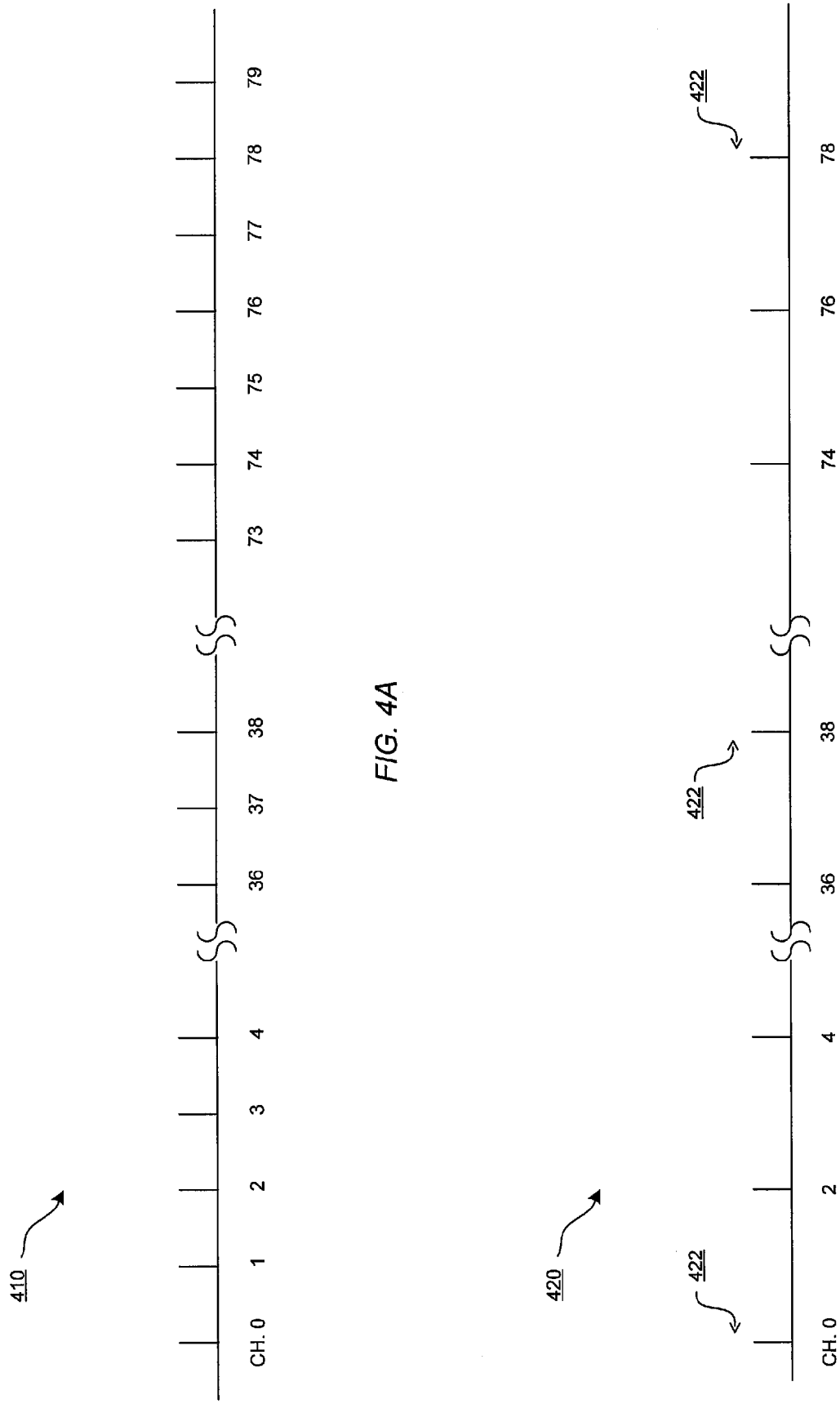
FIG. 4A is a diagram illustrating various frequencies used by a non-BLE Bluetooth device.
FIG. 4B is a diagram illustrating various frequencies used by a Bluetooth low energy device.

FIG. 4A is a diagram illustrating various frequencies used by a non-BLE Bluetooth device. Referring to FIG. 4A, there is shown a diagram 410 that illustrates various frequencies that may be, for example, center frequencies for the 80 channels that may be used by a non-Bluetooth low energy (non-BLE) Bluetooth device. A non-BLE Bluetooth device may comprise a Bluetooth devices is only operable to support and utilized Basic Rate/Extended Data Rate (BR/EDR) communications. Each of the channels used by non-BLE Bluetooth devices may have a center frequency of (2402+K) MHz, and where K is an integer from 0 to 79.

FIG. 4B is a diagram illustrating various frequencies used by a Bluetooth low energy device. Referring to FIG. 4B, there is shown a diagram 420 that illustrates various frequencies that may be, for example, center frequencies for the 40 channels that may be used by a Bluetooth low energy device. Three of the 40 channels may be used for communication set-up, while the other 37 channels may be used for data transfer. Each of the channels used by Bluetooth low energy devices may have a center frequency of (2402+2L) MHz, where L is an integer from 0 to 39. The set-up channels may have a center frequency of (2402+2M) MHz, where M may have a value of 0, 19, and 39. The set-up channels, channels 0, 38 and 78, may be indicated by the label 422. The three set-up channels 422 may be utilized to enable discovery of BLE peers. For example, an 'advertiser' device may transmit via the three access channels 422 to indicate availability of BLE communication via the advertiser device. Nearby 'scanner' devices may then be enabled to discover the availability of the advertiser device by monitoring the predetermined access channels 422. Remaining 37 channels may then be utilized to establish dedicated peer-to-peer BLE connection between the devices while the three set-up channels 422 may be utilized to perform connection set-up operations as well.

In an exemplary aspect of the invention, a Bluetooth device that is operable to support both BLE and non-BLE activity may be enabled to initiate dual-mode scan commands to a Bluetooth controller in the device, wherein "Scan for BLE and non-BLE". A fast scan may then be performed. Where activity may be detected near one of the three set-up channels based on the fast scan, a determination that one or more BLE devices may be present may be made. Consequently, a BLE based scan on the advertising channels is then performed, wherein normal BLE based scan may be scheduled before any normal non-BLE based scans. However, where activity is detected on or near non-set-up channels, normal non-BLE based scans may be scheduled before any normal BLE based scans.

Figure 5:
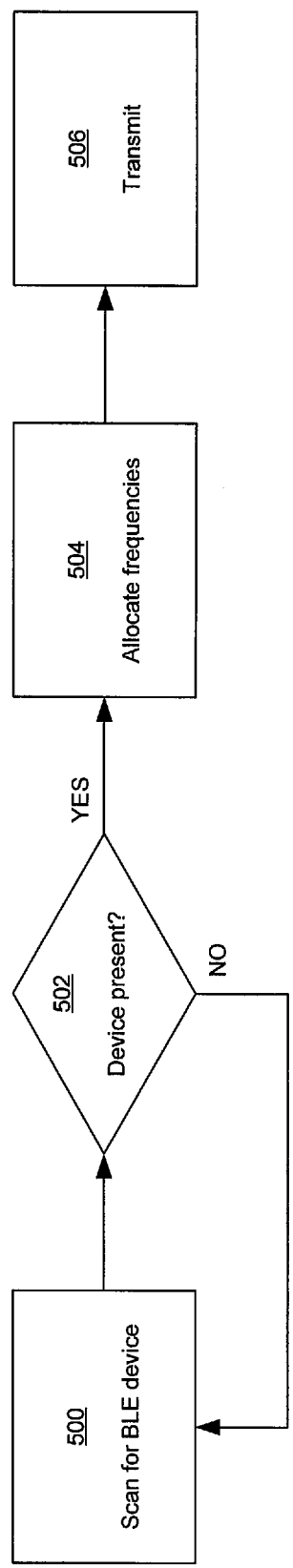
FIG. 5 is a flow diagram illustrating exemplary steps for detecting BLE devices and coexisting with BLE devices, in accordance with an embodiment of the invention.

FIG. 5 is a flow diagram illustrating exemplary steps for detecting BLE devices and coexisting with BLE devices, in accordance with an embodiment of the invention. Referring to FIG. 5, there are shown steps 500 to 506. In step 500, a wireless device, such as, for example, the wireless device 200, may scan for Bluetooth low energy signal activity. The scanning may comprise, for example, using a fast scan and/or a normal scan. Fast scanning may comprise determining, for example, RF energy for a frequency spectrum comprising one or more channels. Normal scan may comprise, for example, receiving and demodulating signals at each channel associated with an Bluetooth low energy device to determine whether that channel is being used for communication by an Bluetooth low energy device.

In step 502, it may be determined whether there are Bluetooth low energy devices in the area and, if so, whether some form of coexistence with the Bluetooth low energy devices may be used. The determination of whether there are Bluetooth low energy devices may comprise using a fast scan and/or a normal scan. For example, a fast scan may detect greater than expected RF level in a frequency spectrum. A normal scan may then demodulate signals from each channel in the frequency spectrum for which a fast scan was performed to verify whether any Bluetooth low energy device transmission may be occurring in that channel. A specific method for determining whether there is Bluetooth low energy transmission in a channel may be design and/or implementation dependent. If there is a determination of Bluetooth low energy transmission, then the next step may be step 504. Otherwise, the next step may be step 500.

In step 504, the wireless device 200 may determine which frequencies may be used to avoid interfering with the Bluetooth low energy devices. For example, a wireless device such as a non-BLE Bluetooth device and/or a WiFi LAN device that transmits in a same frequency spectrum as that allocated for the Bluetooth low energy device may interfere with the Bluetooth low energy communication. In step 506, the wireless device may communicate via, for example, the transceiver 210 and/or 212, according to the frequencies that may be allocated for use by each of the transceivers 210 and 212.

Figure 6:
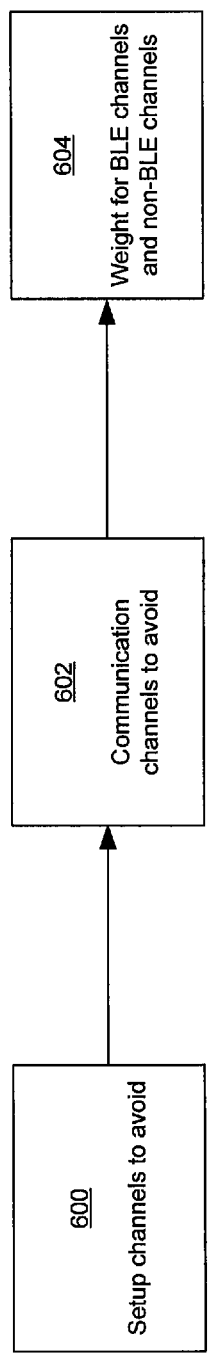
FIG. 6 is a flow diagram illustrating exemplary steps for allocating frequencies for transmission, in accordance with an embodiment of the invention.

FIG. 6 is a flow diagram illustrating exemplary steps for allocating frequencies for transmission, in accordance with an embodiment of the invention. Referring to FIG. 6, there are shown steps 600 to 604. In step 600, a determination may be made regarding, for example, which of the three access channels may be avoided by a non-Bluetooth low energy device, such as, for example, the transceiver 210. The number of access channels to avoid may depend on, for example, the amount of Bluetooth low energy traffic that may be detected. For example, an algorithm may indicate that no access channel may need to be avoided since there may be very little Bluetooth low energy traffic. As the Bluetooth low energy traffic increases, the transceiver 210 may need to avoid one access channel, then two access channels, and finally all three access channels. The determination of which access channels to avoid may be made by, for example, by a processor such as the processor 106 and/or the baseband processor 104. The specific algorithm that determines the number of access channels to avoid by a non-ultra low power device may be design and/or implementation dependent. Alternatively, a simplified approach may be utilized wherein the three access channels may completely be avoided whenever any BLE activity is present on any of the 3 advertiser channels, to reduce processing and control operations for example.

In step 602, the wireless device 200 may determine which channels may be used by the transceiver 210. For example, in an exemplary scenario where the transceiver 210 may be used for non-BLE Bluetooth transmission, an algorithm may be used to determine which of the even Bluetooth channels 0, 2, 4, . . . , 78 may be avoided by the transceiver 210. This may be, for example, to avoid interfering with Bluetooth low energy transmission by other devices that use the Bluetooth channels 0, 2, 4, . . . , 78.

The algorithm may take into account, for example, the amount of transmission by the Bluetooth low energy devices, by the non-ultra low power Bluetooth devices, and/or by other devices, such as, for example, the WiFi LAN devices may also transmit on a portion of the frequency spectrum used by the Bluetooth channels 0 . . . 79. For example, in instances where there is very little Bluetooth low energy device transmission, but a great deal of other types of transmission by non-ultra low power Bluetooth devices and/or by the WiFi LAN devices, all or most of the channels allocated for Bluetooth low energy transmission may be allocated for use by the transceiver 210, which may be a non-ultra low power Bluetooth device or a WiFi LAN device.

In other instances, where there may be a great deal of transmission by, for example, Bluetooth low energy devices, and very little transmission by non-Bluetooth low energy devices, none of the channels allocated for Bluetooth low energy device transmission may be allocated for use by the transceiver 210, where the transceiver 210 may be a non-ultra low power Bluetooth device. Again, the specific algorithm that determines the number of communication channels to avoid by a non-ultra low power device may be design and/or implementation dependent.

In step 604, if one or more of the channels that are available for use by Bluetooth low energy device are allowed to be used by non-Bluetooth low energy devices, a determination may be made as to the usage weight to give to transmission using the odd Bluetooth channels 1, 3, ..., 77, 79 versus the even channels that are allowed to be used by the non-Bluetooth low energy devices. For example, if the transceiver 210 is allowed to use all of the odd Bluetooth channels, as well as all of the even Bluetooth channels, a usage weighting factor may allow the transceiver 210 to use the odd Bluetooth channels 75% of the time, and using the even Bluetooth channels 25% of the time. The usage weight management may be performed, for example, via the arbitration block 230, wherein the AFH maps need not be changed. The arbitration block 230 may track channel use, and may skip, for example, channels that deemed to be weighed less.

Various embodiments of the invention may comprise a method and system for quick Bluetooth low energy (BLE) protocol signal presence detection for coexistence. In accordance with an embodiment of the invention, aspects of an exemplary system may comprise, for example, a mobile terminal such as the wireless device 300, which may be substantially similar to the wireless device 200 that may comprise transceivers 210 and 220. The wireless device 200 may be similar to the wireless device 100. Accordingly, the wireless device 300 may utilize, for example, the baseband processor 104 and/or the processor 106, and/or the transceivers 210 and/or 220 to determine a presence of Bluetooth low energy communication. In an embodiment of the invention, the transceiver 210 may be associated with non-ultra low power communication, such as a non-ultra low power Bluetooth communication or a WiFi communication, and the transceiver 220 may be associated with Bluetooth low energy communication. Accordingly, the transceivers 210 and 220 may be collocated. The wireless device 300 may determine whether communication via the Bluetooth subsystem 302 may interfere with communication via the BLE subsystem 304. Operating parameters may be communicated between the BLE subsystem 302 and the Bluetooth subsystem 304 to enable mitigating any interference to the BLE subsystem 302 by any of the Bluetooth subsystem 304, wherein the BLE subsystem 302 and/or the Bluetooth subsystem 304 may be configured based on the communicated operating parameters. The operating parameters may comprise the adaptive frequency hopping (AFH) maps 410 and/or 420 that may be utilized by the BLE subsystem 302 and/or the Bluetooth subsystem 304, respectively. The AFH maps of the Bluetooth subsystem 304 may be adjusted to enable or disable at least some of plurality of frequency bands that may be utilized by both of the BLE subsystem 302 and/or the Bluetooth subsystem 304. The wireless device 300 may be enabled to detect energy associated with communication via the BLE subsystem 302. The energy detection may be performed by scanning plurality of frequency bands that may be utilized for communication via the BLE subsystem 302. A subset of the plurality of frequency bands, which may comprise the set-up channels 422 or control channels, may be scanned for energy detection wherein the number of channels scanned in subsequent scans may then be increased. Communication via the BLE subsystem 302 may also be predicted based on monitoring of at least some of the plurality of frequency bands that may be used during communication via the BLE subsystem 302, and/or monitoring of at least some of the events that may trigger communication via the BLE subsystem 302

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for quick Bluetooth low energy (BLE) protocol signal presence detection for coexistence.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for communication, the method comprising:
in a communication device comprising one or more Bluetooth low energy (BLE) standard radio interfaces and one or more other radio interfaces:
scanning for energy detection in one or more frequency bands associated with said one or more BLE standard radio interfaces;
scanning at least one channel associated with said one or more BLE standard radio interfaces based upon detected energy in a frequency band of said one or more frequency bands;
determining which of said one or more other radio interfaces will interfere with communications of said one or more BLE standard radio interfaces based at least in part upon the frequency band in which said detected energy was detected; and
managing operation of said one or more BLE standard radio interfaces and said determined one or more other radio interfaces to mitigate said determined communication interference based at least in part upon activity detected on said at least one scanned channel, the managing comprising applying a usage weight algorithm to channel usage of the one or more other radio interfaces such that the at least one channel is used less often by the one or more other radio interfaces than other channels.

2. The method according to claim 1, comprising communicating operating parameters between said one or more BLE standard radio interfaces and said determined one or more other radio interfaces.

3. The method according to claim 2, comprising configuring one or both of said one or more BLE standard radio interfaces and said determined one or more other radio interfaces based on said communicated operating parameters.

4. The method according to claim 1, comprising detecting energy associated with communication via said one or more BLE standard radio interfaces in said one or more scanned frequency bands.

5. The method according to claim 1, wherein said at least one scanned channel comprises an access channel utilized by said one or more BLE standard radio interfaces.

6. The method according to claim 5, comprising upon completion of said scanning of said at least one scanned channel, increasing a number of channels being scanned in a subsequent scan.

7. The method according to claim 1, comprising exchanging corresponding adaptive frequency hopping (AFH) maps between said one or more BLE standard radio interfaces and said determined one or more other radio interfaces.

8. The method according to claim 7, comprising applying a usage weight algorithm to the adaptive frequency hopping (AFH) maps of the determined one or more other radio interfaces such that one or more frequencies of the AFH associated with the at least one channel are selected for hopping at least once but less often than other frequencies of the AFH.

9. The method according to claim 1, comprising predicting Bluetooth low energy activity based on monitoring one or more channels utilized by said one or more BLE standard radio interfaces.

10. The method according to claim 1, comprising predicting Bluetooth low energy activity based on monitoring one or more events communicated via said one or more BLE standard radio interfaces.

11. A system for communication, the system comprising:
one or more circuits in a communication device that comprises one or more Bluetooth low energy (BLE) standard radio interfaces and one or more other radio interfaces;
said one or more circuits configured to determine which of said one or more other radio interfaces will interfere with communications of said one or more BLE standard radio interfaces based at least in part upon detected energy in one or more frequency bands associated with said one or more BLE standard radio interfaces;
said one or more circuits configured to determine at least one BLE channel to avoid based at least in part upon detected energy in said one or more frequency bands; and
said one or more circuits configured to manage operation of said one or more other radio interfaces to avoid said at least one BLE channel to mitigate said determined communication interference with said one or more BLE standard radio interfaces by at least applying a usage weight algorithm to channel usage of the one or more other radio interfaces such that the at least one BLE channel is used less often by the one or more other radio interfaces than other BLE channels.

12. The system according to claim 11, wherein said one or more circuits configured to communicate operating parameters between said one or more BLE standard radio interfaces and said one or more other radio interfaces.

13. The system according to claim 11, wherein said one or more circuits configured to configure one or both of said one or more BLE standard radio interfaces and said one or more other radio interfaces based on said communicated operating parameters.

14. The system according to claim 11, wherein said one or more circuits configured to detect energy associated with communication via said one or more BLE standard radio interfaces.

15. The system according to claim 14, wherein said one or more circuits configured to scan one or more frequency bands utilized by said one or more BLE standard radio interfaces for said detection of said energy.

16. The system according to claim 14, wherein said one or more circuits configured to scan a subset of said one or more frequency bands for said detection of said energy, said subset comprising at least one BLE channel utilized by said one or more BLE standard radio interfaces.

17. The system according to claim 16, wherein said subset of said one or more frequency bands comprises BLE channels for data transfer.

18. The system according to claim 11, wherein said one or more circuits configured to exchange corresponding adaptive frequency hopping (AFH) maps between said one or more BLE standard radio interfaces and said one or more other radio interfaces.

19. The system according to claim 18, wherein said one or more circuits configured to adjust said corresponding adaptive frequency hopping (AFH) maps, independently of the corresponding AFH, to enable or disable transmission or reception via one or both of said one or more BLE standard radio and said one or more other radio interfaces.

20. The system according to claim 11, wherein said one or more circuits configured to predict Bluetooth low energy activity based on monitoring one or more BLE channels utilized by said one or more BLE standard radio interfaces.

21. The system according to claim 11, wherein said one or more circuits are operable to predict Bluetooth low energy activity based on monitoring one or more events communicated via said one or more BLE standard radio interfaces.

22. A method for communication, comprising:
in a communication device comprising a Bluetooth low energy (BLE) standard radio interface and one or more other radio interfaces:
scanning to detect energy in one or more frequency bands including a plurality of channels associated with the BLE standard radio interface;
determining at least one channel of the plurality of channels to at least partially avoid based at least in part upon detected energy in the one or more frequency bands; and
managing operation of the one or more other radio interfaces to mitigate communication interference with the BLE standard radio interface based upon the determined at least one channel to at least partially avoid,
wherein the managing comprises applying a usage weight algorithm to channel usage of the one or more other radio interfaces such that the at least one channel is used less often by the one or more other radio interfaces than other channels of the plurality of channels.

23. The method of claim 22, wherein the at least one channel is used at least once by at least one of the one or more other radio interfaces.

24. The method of claim 22, wherein the determined at least one channel to at least partially avoid includes at least one of an access channel associated with the BLE standard radio interface or a subset of the plurality of channels associated with the BLE standard radio interface.

* * * * *